United States Patent
Sundqvist et al.

(10) Patent No.: US 6,549,669 B1
(45) Date of Patent: Apr. 15, 2003

(54) PREDICTIVE AUDIO AND VIDEO ENCODING WITH SMOOTH SCENE SWITCHING CAPABILITY

(75) Inventors: Jim Sundqvist, Luleå (SE); Henrik Bergquist, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/299,390

(22) Filed: Apr. 27, 1999

(51) Int. Cl.[7] .................................................. G06K 9/46
(52) U.S. Cl. ...................................... 382/238; 382/236
(58) Field of Search ................................. 382/236, 238; 386/68, 98; 348/143

(56) References Cited

U.S. PATENT DOCUMENTS

| | | | |
|---|---|---|---|
| 4,716,453 A | * 12/1987 | Pawelski | 358/13 |
| 5,416,520 A | 5/1995 | Kuzuma | 348/409 |
| 5,446,491 A | 8/1995 | Shibata et al. | 348/15 |
| 5,602,592 A | 2/1997 | Mori et al. | 348/415 |
| 5,684,954 A | 11/1997 | Kaiserswerth et al. | 395/200.2 |
| 5,790,179 A | 8/1998 | Shibata et al. | 348/15 |
| 5,841,475 A | * 11/1998 | Kurihara et al. | 348/409 |
| 5,850,207 A | * 12/1998 | Eglit | 345/132 |
| 5,859,932 A | * 1/1999 | Etoh | 382/253 |
| 5,923,783 A | * 7/1999 | Kawauchi et al. | 382/233 |
| 5,933,536 A | * 8/1999 | Fukuzawa | 382/246 |

FOREIGN PATENT DOCUMENTS

| | | | |
|---|---|---|---|
| EP | 0590974 | 4/1994 | G11B/27/031 |
| EP | 0606675 | 7/1994 | H04N/7/13 |
| WO | 9728652 | 8/1997 | H04N/7/52 |
| WO | 9832281 | 7/1998 | H04N/5/262 |

OTHER PUBLICATIONS

Patent Abstracts of Japan, JP 08 147000 A (Yamaha Corp); Jun. 7, 1996; abstract.
Patent Abstracts of Japan, JP 09 186942 A (Sony Corp); Jun. 15, 1997; abstract.
Patent Abstracts of Japan, JP 09 114497 A (Olympus Optical Co); May 2, 1997; abstract.
Patent Abstracts of Japan, JP 07 231317 A (Fuji Xerox Co Ltd); Aug. 29, 1995; abstract.
NTT Review, *"Trends of Multimedia Applications from the Viewpoint of Quality of Service and Traffic Aspects"*, vol. 10, No. 2, Mar. 1998, K. Ishibashi et al., pps. 44–49. XP000740453.

* cited by examiner

*Primary Examiner*—Anh Hong Do
(74) *Attorney, Agent, or Firm*—Jenkens & Gilchrist, P.C.

(57) ABSTRACT

In predictive video and audio encoding/decoding, a stimulus change at the encoder is smoothly accommodated by causing a video codec to exchange image data with a cache memory, and by homing an audio codec.

46 Claims, 10 Drawing Sheets

PREDICTIVE AUDIO AND VIDEO ENCODING WITH SMOOTH SCENE SWITCHING CAPABILITY

FIELD OF THE INVENTION

The invention relates generally to audio and video encoding and, more particularly, to scene switching in predictive audio and video encoding.

BACKGROUND OF THE INVENTION

FIG. 1 illustrates a conventional system wherein audio and video inputs received at a transmitter are respectively encoded, and the encoded audio and video information is transmitted across a communication channel to a receiver that decodes the encoded audio and video information into respective audio and video outputs which are intended to closely match the audio and video inputs. Examples of the transmission channel of FIG. 1 include wireless transmission channels and data networks such as the Internet.

Audio encoding in FIG. 1 can be accomplished using predictive coding, such as performed, for example, by the well known CELP codec. Such a predictive codec (coder/decoder) includes digital filters which have memory. A short-term filter is used to predict the vocal tract, and a long-term filter is used to predict the vocal chords. A codebook which contains a set of excitation vectors is used to describe the residual (i.e., non-predictable) data.

The input signal to such a predictive audio codec is divided into frames, typically less than 40 milliseconds of audio data per frame. For each frame, a set of filter parameters and the excitation vectors describing that particular frame are derived using digital signal processing. The calculation of filter parameters depends not only on the current audio frame, but also on the state of the digital filters when they begin processing the current frame. For example, if an input signal suddenly becomes completely silent, the memory of the digital filters would generate a signal that would extend into the silent frame. This is conventionally called ringing. When calculating the parameters for the short-term filter and the long-term filter, conventional codecs compensate for the aforementioned ringing phenomenon.

It is well known that, when starting an audio decoder, audible artifacts could result if the filter states of the decoder are initialized with nonrepresentative values, such as random values or even zeros. Therefore, pre-determined filter states are often preloaded into the filters to initialize the audio decoder. This procedure is conventionally known as audio decoder homing.

In conventional video encoding, the video encoder receives a video input from a camera, and takes a snapshot of (captures) the incoming video for encoding. There are several well-known conventional video encoding/decoding techniques, for example MPEG1 and MPEG2. MPEG1 is well suited to video coding for CD-based video. The MPEG1 standard specifies the syntax of the coded bit stream and also describes a model decoder. Frames of video are coded as pictures, with each frame being encoded in a progressive order. There are three main types of coded pictures in MPEG1, namely I-pictures (intrapictures) which are intraframe encoded and do not use prediction, P-pictures (forward predicted pictures) which are interframe encoded using motion prediction from a previous I or P picture in the sequence, and B-pictures (bidirectional predicted pictures) which are interframe encoded using interpolated motion prediction between a previous I or P picture and the next I or P picture in the sequence.

MPEG2 extends the functionality provided by MPEG1 to enable efficient coding of video and associated audio at a wide range of resolutions and bit rates. MPEG2 describes a range of profiles and levels which provide encoding parameters for a range of applications. Each profile specifies a particular set of coding features.

In the above-described predictive video encoding techniques such as MPEG1 and MPEG2, the current output of the video decoder depends on the previous output of the video decoder, for example in P pictures and B pictures. Similarly, in the above-described predictive audio encoding techniques, such as CELP coding, the current output of the audio decoder depends on the state that the audio decoder's digital filters were left in after calculating the previous audio decoder output. This reliance on a previous video encoder output or a previous digital filter state of an audio decoder can dramatically degrade the audio and video quality when the audio and video inputs of FIG. 1 are switched from one scene to another.

Referring now to the conventional audio/video transmitter arrangement shown in FIG. 2, a plurality of video cameras are switchably connectable to the video encoder. Also, when switching from the camera associated with scene A to the camera associated with scene B, the input of the audio encoder is also switched from sound A associated with scene A to sound B associated with scene B. Examples of such an arrangement could be surveillance equipment, or a lecture with a teacher (scene A and sound A) and students (scene B and sound B).

When switching between scene A and scene B, the difference in the corresponding images may be quite large. If the picture produced directly after the switching operation is to be predicted based on the previous picture (such as a P or B picture in MPEG1 or MPEG2), the large difference between the two pictures will typically cause a very noticeable effect in the video stream, and several subsequent frames will typically be required to "catch up" after the switch. This effect is quite noticeable when using conventional video conferencing tools such as VIC, especially if the scene is switched back and forth several times.

The arrangement of FIG. 2 will not adversely affect the audio encoding process because, as mentioned above, conventional predictive audio codecs compensate for the ringing effect.

FIG. 3 illustrates another conventional audio/video transmitter arrangement wherein each video stimulus (scene A, scene B) has its own video encoder, and each audio stimulus (sound A, sound B) has its own audio encoder. The outputs of each audio and video encoder are then transmitted over the communication channel. In this configuration, the receiver (at the other end of the channel) can switch between the different scenes and corresponding sounds. Switching between two audio encoded streams will break the sequence of consecutive audio frames and, if there is a mismatch between the filter states and the incoming filter parameters and excitation vectors, an audible artifact might well be generated. When the receiver switches between video streams, the video decoder will disadvantageously generate the first picture after the switch based on an erroneous previous picture.

FIG. 4 illustrates a conventional audio/video receiver arrangement which can be used with the transmitter arrangements of FIG. 2 or FIG. 3, and wherein the aforementioned problems can occur during scene switching. A single audio decoder receives an input encoded audio stream (which can include both the audio A stream and audio B stream of FIG. 3), and a single video decoder receives an input encoded video stream (which can include the video A stream and video B stream of FIG. 3).

It is desirable in view of the foregoing to provide predictive audio and video encoding which accommodates switching among multiple scenes/sounds without the aforementioned disadvantages of the prior art.

The present invention provides for smooth switching among multiple scenes/sounds in a predictive audio/video encoding environment.

DETAILED DESCRIPTION

Figure 5:
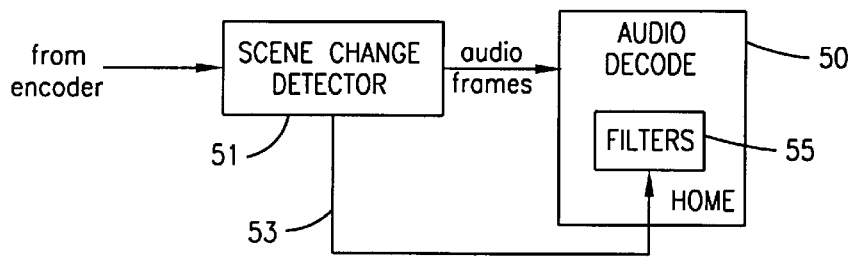
FIG. 5 illustrates pertinent portions of exemplary embodiments of an audio decoder according to the invention.

FIG. 5 illustrates pertinent portions of exemplary embodiments of a predictive audio decoder according to the invention. For example, the exemplary structure of FIG. 5 could be included in a CELP decoder. The audio decoder of FIG. 5 includes a scene change detector 51 which receives audio frames from the audio encoder (via the transmission channel). The scene change detector examines the audio frames and determines therefrom whether the audio frames are associated with, for example, scene A/sound A or scene B/sound B of FIGS. 2 or 3. The scene change detector 51 includes an output 53 coupled to a Home input of digital filters 55 in an audio decode unit 50 (for example the short-term and long-term filters of a CELP decoder). When the scene change detector 51 detects a change in the scene/sound stimulus, for example from A to B, the output 53 thereof activates the Home input of the filters at 55, thereby homing the filters. After analyzing the input audio frames and homing the filters as necessary, the scene change detector 51 passes the audio frames on to the audio decode unit 50 which can use the filters (homed as necessary) to perform predictive audio decoding in conventional fashion.

Figure 6:
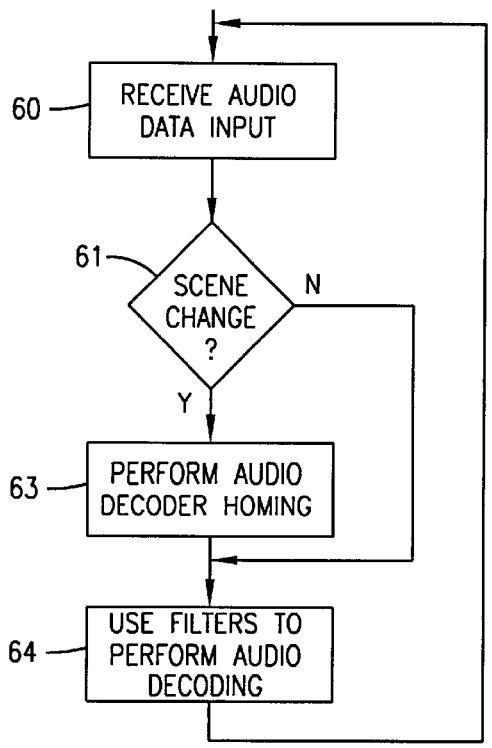
FIG. 6 illustrates exemplary operations performed by the audio decoder of FIG. 5.

FIG. 6 illustrates exemplary operations of the audio decoder of FIG. 5. The audio data input is received at 60. If a scene change (i.e., audio stimulus change) is detected at 61, the audio decoder homing operation is performed at 63, after which audio decoding can be performed in conventional fashion at 64, using the homed filters. This homing operation reduces the likelihood that audible artifacts will occur in response to a change in the sound stimulus. If no scene change is detected at 61, then the homing step is bypassed and decoding is performed at 64.

Figure 7:
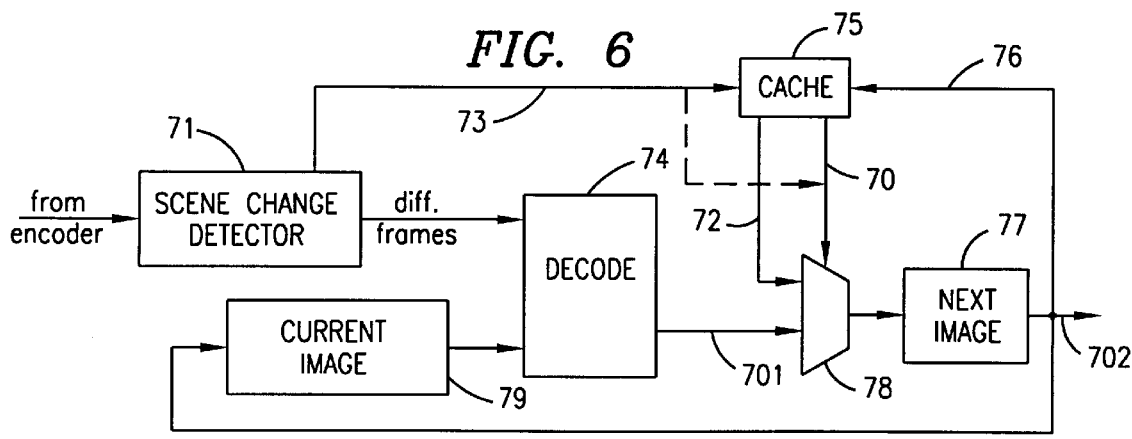
FIG. 7 illustrates pertinent portions of exemplary embodiments of a video decoder according to the invention.

FIG. 7 illustrates pertinent portions of exemplary embodiments of a predictive video decoder according to the invention. The video decoder of FIG. 7 includes a scene change detector 71 which receives as an input the encoded video data output from a video encoder (via a communication channel). The encoded video data received from the encoder includes a stream of video frames, each of which includes information indicative of a difference between timewise successive snapshots taken by the camera and fed to the video encoder (see FIGS. 2 and 3). This general technique of a video encoder providing to a video decoder a sequence of frames each indicative of a difference between two successive snapshots in a sequence of snapshots is well know in the art and is used, for example in MPEG1 and MPEG2 encoding.

The scene change detector 71 analyzes the received video frames to determine whether the video stimulus has changed, for example, from scene A to scene B. When a scene change is detected by the scene change detector 71, this detection is signaled to a control input 73 of a cache memory 75. In response to the scene change detection signal at 73, the cache memory 75 stores therein the contents of a next image register 77 whose output 702 is coupled to cache memory data input 76. Also in response to the scene change detection signal received at 73, the cache memory outputs a control signal at 70 causing a selector 78 to route a data output 72 from the cache 75 to an input of 14 the next image register 77.

The output 702 of next image register 77 provides the output image data of the decoder of FIG. 7, and is also coupled to load a current image register 79. The contents of the current image register 79 are input to a decode unit 74 along with the snapshot difference frames which, after analysis in the scene change detector, are passed on to the decode unit. The decode unit can perform conventional predictive video decoding wherein the current image is used, in combination with the current frame of snapshot difference information received from the encoder, to predict the next image. The decode section 74 outputs the predicted image at 701. This predicted image is normally input to the next image register 77 via selector 78 (which corresponds to conventional video decoder operation), except when the scene change detector 71 has detected a change in the video stimulus, in which case the control output 70 from cache memory 75 causes the selector 78 to load the next image register 77 from the cache data output 72.

As indicated above, in a normal (conventional) decode cycle, the decode section 74 produces a predicted image at 701 in response to the current image and the current snapshot difference frame. This predicted image is loaded into the next image register 77 at the end of the decode cycle. Prior to the next decode cycle, the next image information at 77 is loaded into the current image register 79 for use in the next decode cycle. This use of successive predictive decoding cycles is well known in the art, for example in the MPEG1 and MPEG2 standards. As discussed in detail below, by loading the next image register 77 from the cache 75 when a scene change is detected at 71, the video decoder of FIG. 7 avoids predicting the next image based on a snapshot difference which, due to the detected scene change, likely indicates a large difference, potentially resulting in an erroneous predicted image at 701.

Figure 8:
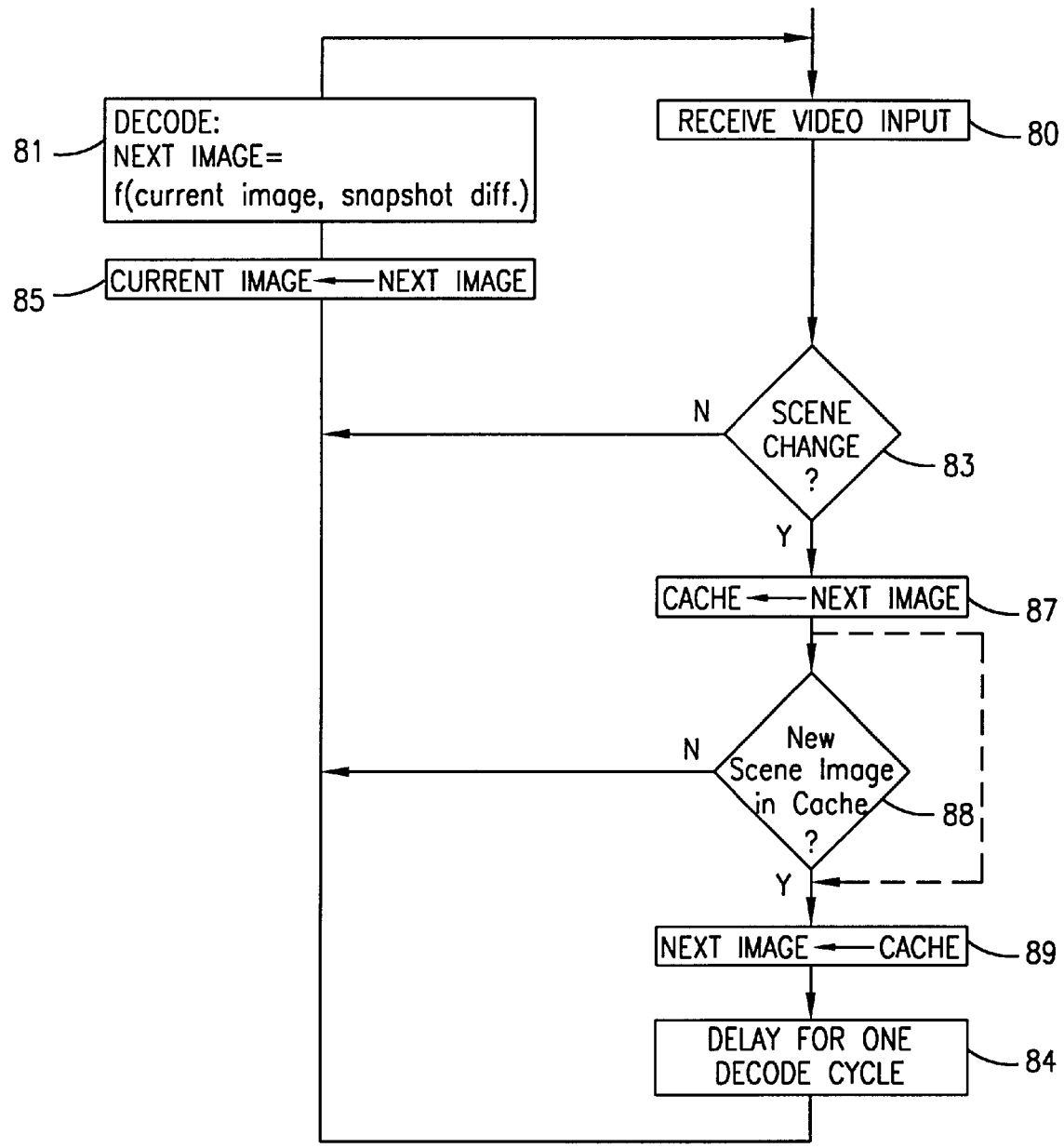
FIG. 8 illustrates exemplary operations which can be performed by the video decoder of FIG. 7.

FIG. 8 is a flow diagram illustrating the above-described exemplary operations of the video decoder of FIG. 7. The current decode cycle is illustrated at 81, wherein the decode section 74 of FIG. 7 produces the next image data as a function of the current image data and the snapshot difference. After video input is received at 80, it is determined at 83 whether or not a scene (video stimulus) change has occurred. If not, then at 85, the image data from the next image register 77 is loaded into the current image register 79 (see FIG. 7), and the next decode cycle is performed at 81.

If a scene change is detected at 83, then at 87, the next image data is stored in the cache memory. Thereafter, it is determined at 88 whether the cache has stored therein image data corresponding to the new scene that has been switched to. If not, then the next image data is forwarded to the current image register at 85, and the next decode cycle is performed at 81. If image data for the new scene is available at 88, then at 89, the next image register is loaded from the cache memory and, after a delay at 84 of approximately one decode cycle, the next image is loaded into the current image register at 85, and the next decode cycle is performed at 81. In this manner, provided there is an appropriate image in the cache memory, the decode cycle corresponding to the large snapshot difference associated with the scene change can be avoided by inserting the image from the cache as the next image produced in that particular decode cycle. After the one decode cycle delay at 84, the next image data (which was loaded into register 77 from the cache 75) is transferred to the current image register at 85, and the first decode cycle associated with the new scene is executed at 81.

Figure 9:
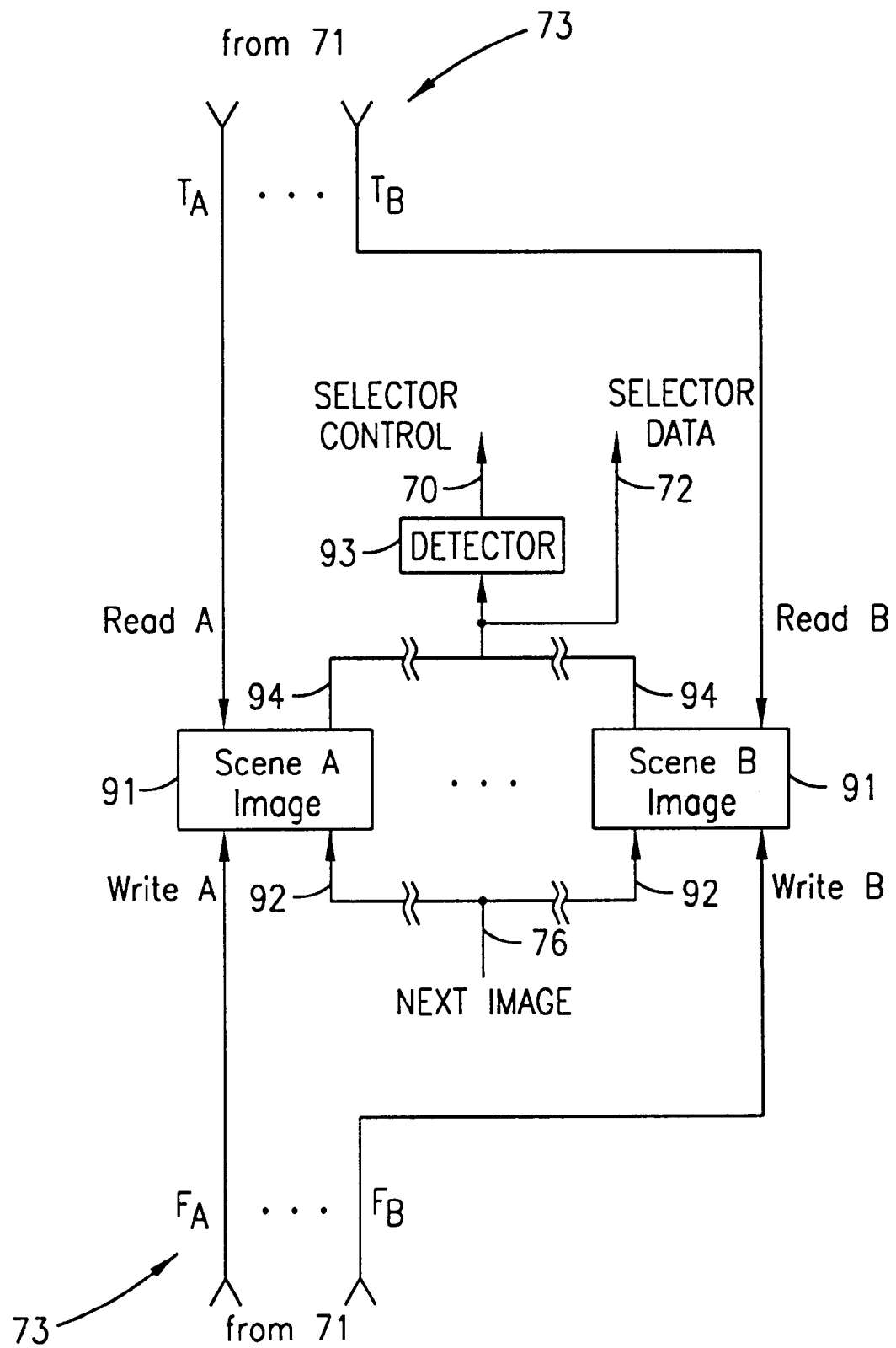
FIG. 9 illustrates an exemplary embodiment of the cache memory of FIG. 7.

FIG. 9 illustrates an exemplary embodiment of the cache memory 75 of FIG. 7. The cache memory embodiment of FIG. 9 includes a plurality of data storage locations 91 for storing encoded image data corresponding to the various scene stimuli which can be input to the video transmitting station. The example of FIG. 9 illustrates storage locations for the image data from scene A and scene B from FIGS. 2 and 3. The cache memory of FIG. 9 can include as many data storage locations 91 as necessary to accommodate all of the scene stimuli that can be input to the video transmitting station. Each of the data storage locations 91 has a data input 92 coupled to the cache input 76 that receives image data from the next image register 77 (see FIG. 7). Each data storage location 91 also has a data output 94 coupled to the cache output 72 that provides cache data to the selector 78 (see FIG. 7). The data output 94 of each data storage location 91 is further coupled to an input of a detector 93 whose output is coupled to the control output 70 that controls selector 78. Each storage location 91 further includes a write control input, for example write A and write B in FIG. 9. The write control inputs are coupled to the control input 73 that receives the control signals output from the scene change detector 71 of FIG. 7.

When the scene change detector 71 of FIG. 7 detects a scene change, it outputs to control input 73 appropriate control signals indicating a scene change from a previous scene to a current scene. The scene change detector 71 of FIG. 7 indicates that the input video stimulus has been switched "from" a given scene by activating one of the control signal $F_A, \ldots F_B$ in FIG. 9. Similarly, the scene change detector 71 indicates that the input video stimulus has switched "to" a given scene by activating a corresponding control signal $T_A, \ldots T_B$ at 73. The "from" signals $F_A, \ldots F_B$ are respectively coupled to the write control inputs of the respective data storage locations 91, and the "to" signals $T_A, \ldots T_B$ are coupled to the respective read control inputs of the data storage locations 91, for example read A and read B.

Figure 1:
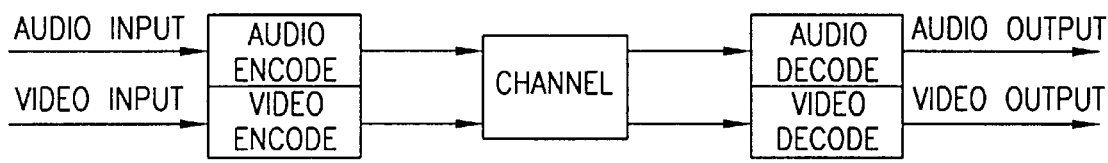
FIG. 1 illustrates a conventional audio/video encode/decode arrangement.
Figure 2:
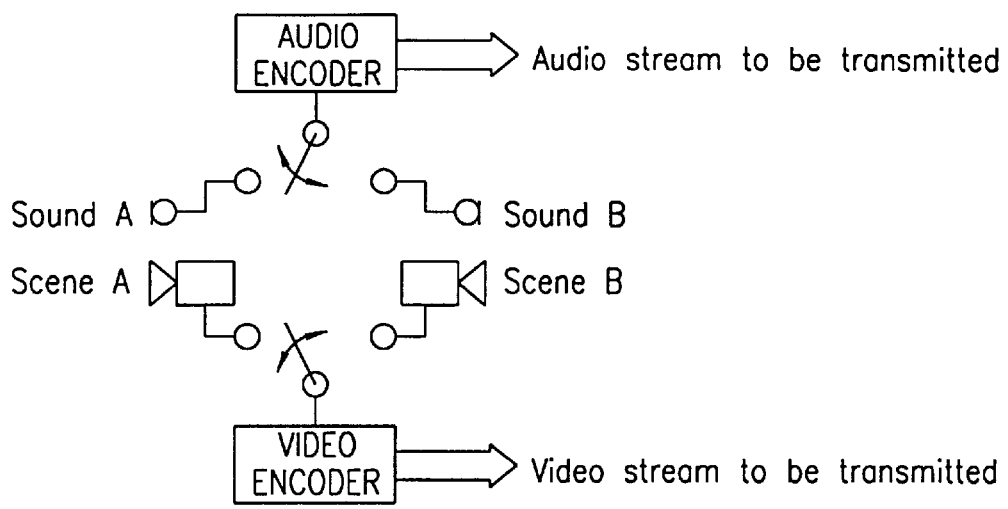
FIG. 2 illustrates a conventional arrangement wherein multiple audio stimuli and multiple video stimuli are switchably connected to an audio encoder and a video encoder, respectively.
Figure 3:
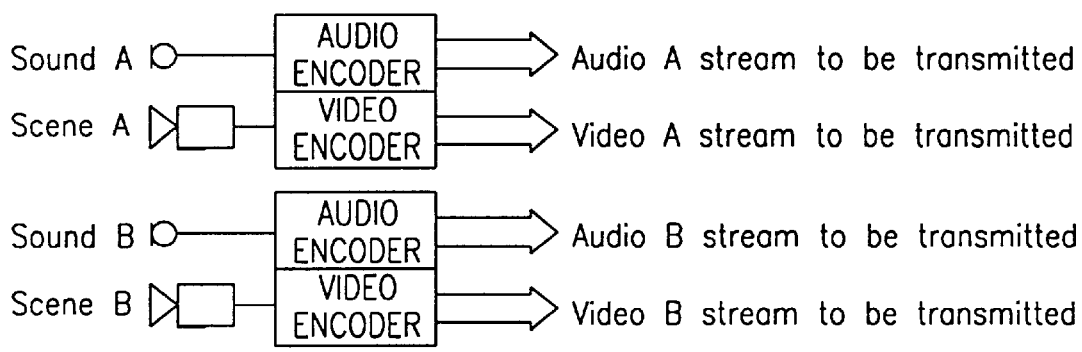
FIG. 3 illustrates a conventional arrangement in which multiple audio and video stimuli are respectively connected to multiple audio and video encoders.
Figure 4:
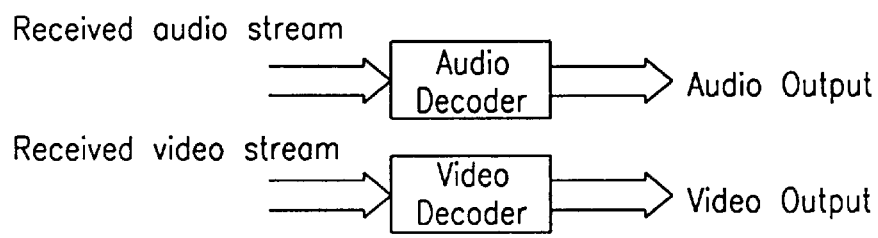
FIG. 4 illustrates a conventional audio/video receiver including a single audio decoder and a single video decoder.

Using the example of FIGS. 2 and 3, if the scene change detector 71 detects a change from scene A to scene B, then signal $F_A$ activates the write control input, write A, of the scene A storage location so that the image data currently in the next image register 77 of FIG. 7 is written into the scene A storage location. Signal $T_B$ from scene change detector 71 also activates the read control input, read B, of the scene B storage location so that the image data stored in the scene B storage location is output at 72 to the selector 78 of FIG. 7. Thus, the scene change detector 71 provides appropriate control signaling at 73 to permit the next image data from next image register 77 to be written into the cache memory location corresponding to the scene that has been changed "from", and also to permit the data input of the selector 78 to receive cached image data corresponding to the new scene that has been changed "to".

The detector 93 of FIG. 9 is operable to detect whether the data output from a given storage location 91 is actual image data that has been previously stored in that storage location. For example, the detector can compare the data output from the storage location to a predetermined initialization data value that is initially stored in all of the storage locations of FIG. 9. If the data output received by the detector 93 from the selected data storage location 91 matches the predetermined initialization data, then the detector 93 does not activate the control output 70 to the selector 78, because the selected storage location has not yet been written to from the next image register 77, and therefore does not contain image data corresponding to the scene that has been switched "to". On the other hand, if the detector 93 determines that the data output from the selected storage location does not match the predetermined initialization data, then the detector 93 activates the control output 70 to the selector 78, thus causing the next image register 77 to be loaded from the data output 72 of cache 75.

In other embodiments, the detector 93 can be eliminated, and the control input 70 of selector 78 can be driven directly from the output 73 of scene change detector 71, as shown in broken line in FIGS. 7 and 8. In such embodiments, the next image register 77 is loaded from cache 75 whenever a scene change is detected.

Figure 10:
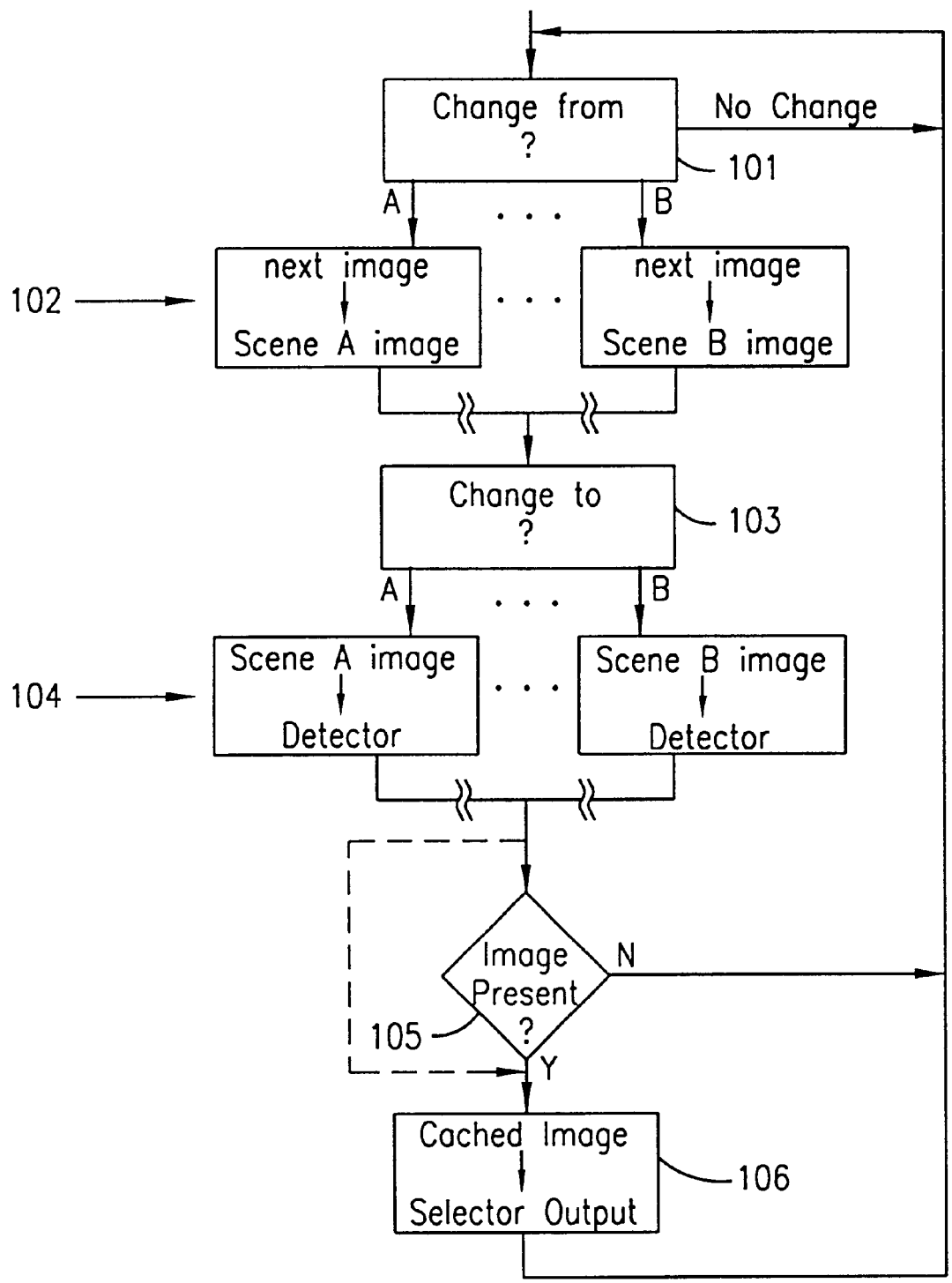
FIG. 10 illustrates exemplary operations which can be performed by the cache memory of FIG. 9.

FIG. 10 illustrates exemplary operations which can be performed by the exemplary cache memory embodiment of FIG. 9. If a scene change is indicated at 101, the scene which has been changed "from" is determined. At 102, the next image data from the next image register 77 (see FIG. 7) is stored in the storage location corresponding to the scene which has been changed "from". At 103, similarly to step 101, it is determined which scene has been changed "to", and at 104 the image data from the corresponding data storage location in the cache is output to the detector 93. At 105, the detector 93 determines whether or not the selected data storage location contains image data corresponding to the scene that has been switched "to". If so, then at 106, the detector 93 activates the control output 70 to selector 78 (see FIG. 7), thereby coupling the cached image to the output of selector 78. On the other hand, if the selected storage location does not include image data corresponding to the desired scene at 105, then the detector does not activate the control output 70, whereby the output 701 of decode section 74 remains coupled to the output of selector 78 (see FIG. 7). In embodiments where the detector 93 of FIG. 9 is omitted, decision 105 is bypassed, as shown in broken line in FIG. 10, and the cached image is passed at 106 to the selector output by control of the scene change detector output (see broken line in FIGS. 7 and 8).

Figure 11:
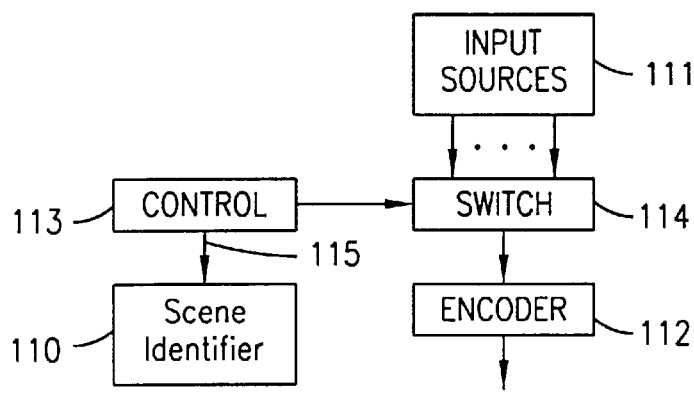
FIG. 11 illustrates a scene identifier according to the invention for use with the conventional encoder arrangement of FIG. 2.

FIG. 11 illustrates diagrammatically a scene identifier 110 according to the invention for use with audio/video transmitter arrangements such as shown in FIG. 2. In FIG. 11, the input sources 111 represent the cameras or the microphones of FIG. 2, and the encoder 112 represents either the video encoder or the audio encoder of FIG. 2. When the conventional switch controller 113 activates the switch 114 to switch from one input source to another (i.e., from one scene to another), information indicative of the two sources involved in the switch (the source that is switched "to" and the source that is switched "from") is provided at 115 to the scene identifier 110. The scene identifier 110 then interfaces with the encoder such that the encoder output includes information indicative of the switch from one source to another.

Figure 12:
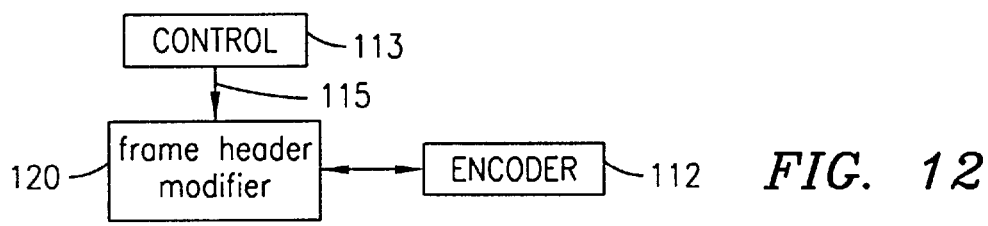
FIG. 12 illustrates an exemplary embodiment of the scene identifier of FIG. 11.

FIG. 12 illustrates one exemplary embodiment of the scene identifier 110 of FIG. 11. In particular, the scene identifier 110 of FIG. 11 is embodied in FIG. 12 as a frame header modifier 120. Conventional audio and video encoders typically include in their output frames both the audio or video data and additional control information provided in a header. According to the invention, the header provided by the encoder can include information indicative of the input source, for example the camera or microphone from which the video or audio input is taken. When the switch controller 113 causes a switch from one input source to another, the frame header modifier 120 signals the encoder 112 to change the source field in the header of all successive frames to designate the new source. Thus, by inspecting the headers of the received frames, the decoder can determine that a scene change has occurred.

Figure 13:
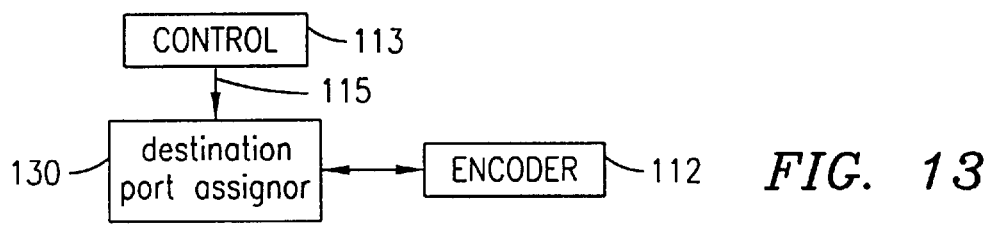
FIG. 13 illustrates another exemplary embodiment of the scene identifier of FIG. 11.

FIG. 13 illustrates another exemplary embodiment of the scene identifier 110 of FIG. 11. In the FIG. 13 embodiment, the scene identifier is implemented as a destination port assignor 130. In FIG. 13, different destination ports in the conventional IP protocol are used to designate the source of the audio or video. For example, a number of IP destination ports equal to the number of audio or video sources could be used. Thus, each video or audio source has its own virtual channel by virtue of its unique destination port number in the IP protocol. Whenever the switch controller 113 causes a switch from one input source to another, the destination port assignor 130 assigns to the ensuing audio or video frames a destination port number in the IP protocol corresponding to the new input scene. The decoder can then determine that a scene change has occurred by detecting a change in the destination port number of the received IP protocol packets.

Figure 14:
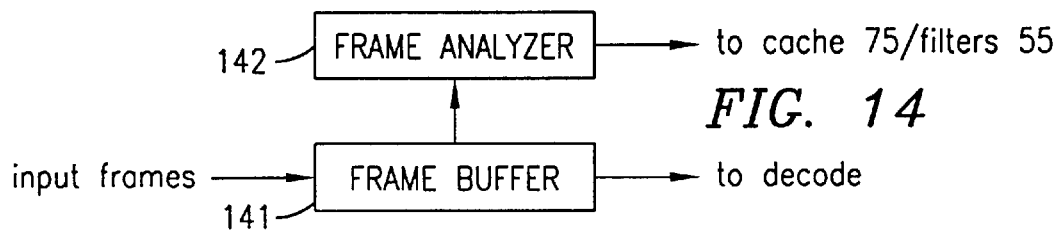
FIG. 14 illustrates an exemplary embodiment of the scene change detector of FIGS. 5 and 7 for use with the scene identifier embodiment of FIG. 12.

FIG. 14 illustrates an exemplary embodiment of the scene change detector of FIGS. 5 and 7. The scene change detector embodiment of FIG. 14 is advantageously cooperable with the scene identifier embodiment of FIG. 12. In FIG. 14, the input frames received from the encoder (via the communication channel) are input to a frame buffer 141. A header analyzer 142 coupled to the frame buffer 141 analyzes the headers of the buffered frames, and detects from the headers' source fields when the input source at the encoder has changed (which corresponds to a scene change). The "from" and "to" scene change information is then output from the header analyzer to the cache memory 75 of FIG. 7 or the filters 55 of FIG. 5. After the header analyzer 142 has analyzed the header of a given frame in the frame buffer 141, that frame is then output from the frame buffer 141 to the audio (FIG. 5) or video (FIG. 7) decode section.

Figure 15:
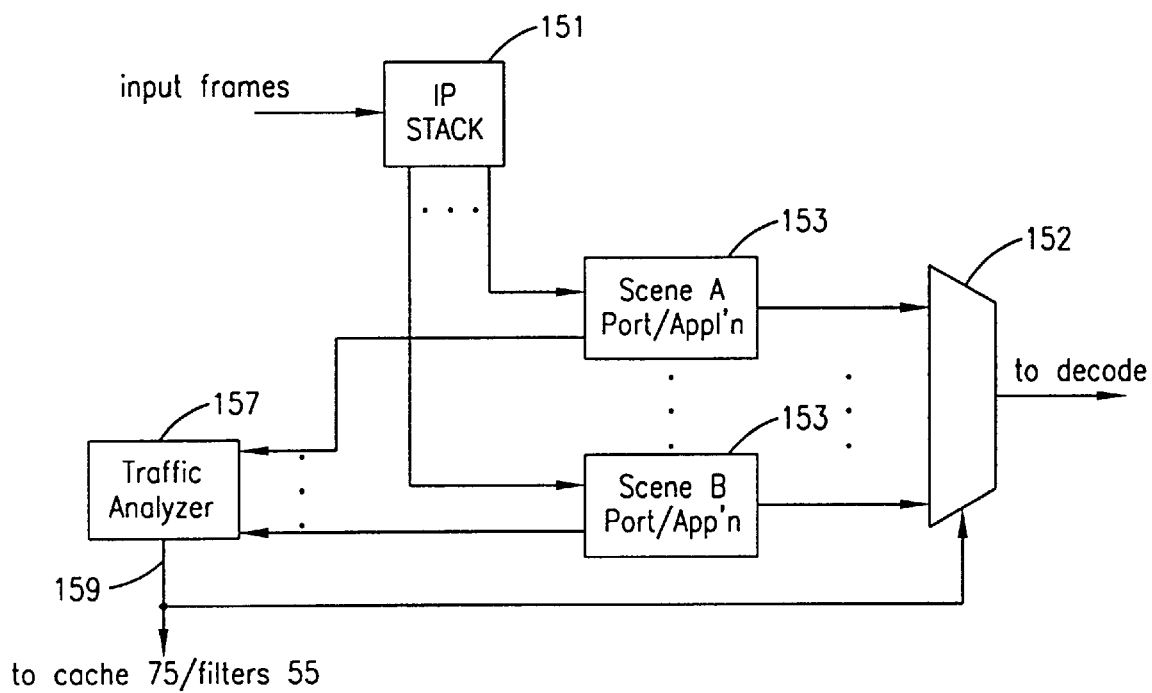
FIG. 15 illustrates another exemplary embodiment of the scene change detector of FIGS. 5 and 7 for use with the scene identifier embodiment of FIG. 13.

FIG. 15 illustrates another exemplary embodiment of the scene change detector of FIGS. 5 and 7. The embodiment of FIG. 15 is advantageously cooperable with the scene identifier embodiment of FIG. 13. The embodiment of FIG. 15 includes a plurality of IP applications 153 running in parallel. An IP application is provided for each scene covered by the transmitter, for example the transmitter of FIG. 2. Each of the IP applications 153 has a unique IP port number. The input frames received from the channel are applied to a conventional IP stack 151 which allocates the input frames to their corresponding IP ports in conventional fashion. As mentioned above with respect to FIG. 13, the assignment of different IP destination port numbers to each camera/microphone creates a set of virtual channels. Each camera/microphone has its own virtual channel and only one of the virtual channels at a time is used.

A traffic analyzer 157 is coupled to each of the IP applications 153, and is operable to detect, for each IP application 153, when that application either begins to handle traffic or ceases to handle traffic. When an IP application begins to handle traffic, this indicates that the transmitter has switched to the scene corresponding to that IP application, and when the traffic in a particular IP application ceases, this indicates that the transmitter has switched from the corresponding scene to another scene. Scene change information output at 159 from the traffic analyzer 157 is applied to a control input of a selector 152. In response to the control input, the selector 152 selects the application which is currently receiving traffic. The output of the selector 152 is then provided to the decode section (in FIG. 5 or FIG. 7). Scene change information from the traffic analyzer is also provided to the cache memory 75 (FIG. 7) or the filters 55 (FIG. 5).

Figure 16:
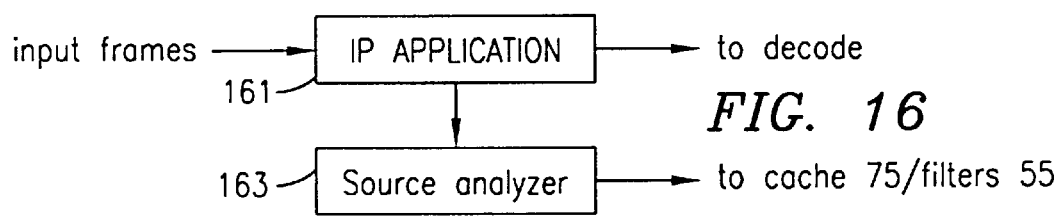
FIG. 16 illustrates another exemplary embodiment of the scene change detector of FIGS. 5 and 7 for use with the encoder arrangement of FIG. 3.

FIG. 16 illustrates another exemplary embodiment of the scene change detectors of FIGS. 5 and 7. The embodiment of FIG. 16 is advantageously cooperable with transmitting stations having separate video and audio encoders for each video and audio stimulus, as shown for example in FIG. 3. In arrangements such as shown in FIG. 3, each encoder (audio or video) already has unique identifying indicia associated therewith. For example, each encoder in a given host (e.g., a voice gateway) would have a different IP source port from all other encoders in that host. Similarly, if some of the encoders are provided in different hosts, then the encoders would have different IP addresses. Thus, given any combination of multiple encoders provided in the same or different hosts, each encoder would have a unique IP source port number and/or IP address which distinguishes it from the other encoders.

In the scene change detector embodiment of FIG. 16, an IP application 161 receives the input frames in conventional fashion and passes them to the decode section of FIG. 5 or FIG. 7. A source analyzer 163 coupled to the IP application 161 analyzes the source information associated with each frame received by the IP application 161, that is, the IP port number and/or IP address. The source analyzer uses the source information to determine when a change from one scene to another has occurred. Information regarding this scene change is then provided to the cache 75 of FIG. 7 or the home input of the filters 55 of FIG. 5.

Figure 17:
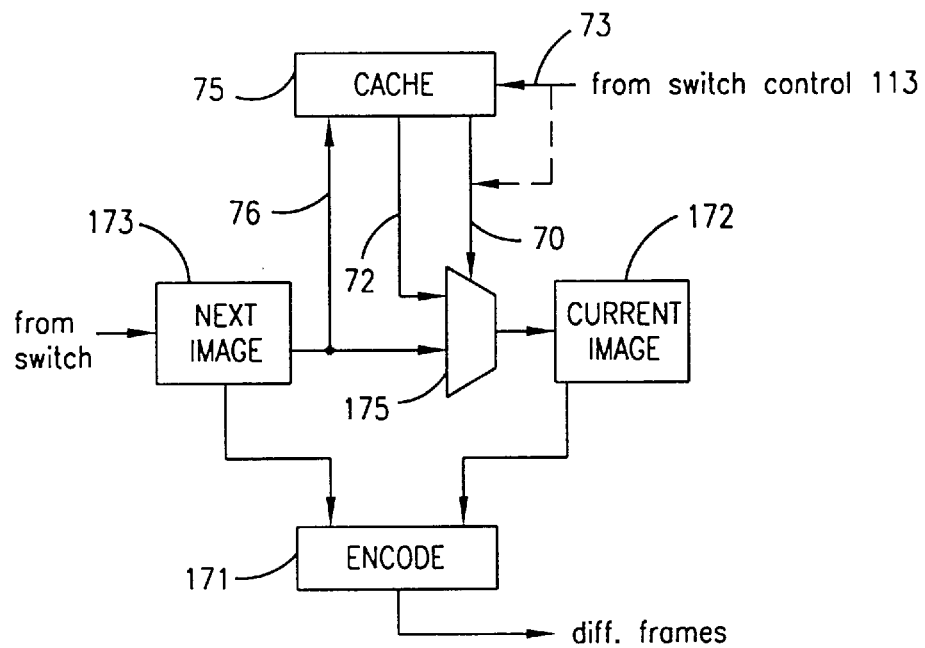
FIG. 17 illustrates pertinent portions of an exemplary embodiment of a video encoder according to the invention.

FIG. 17 illustrates pertinent portions of an exemplary embodiment of a video encoder according to the invention. The video encoder of FIG. 17, which can advantageously be used in transmitter arrangements such as shown in FIG. 2, can include a conventional encode section 171 capable of performing, for example, MPEG encoding operations. In particular, the encoding section 171 can determine a difference between a current image, whose corresponding image data is registered at 172, and the next image, whose corresponding image data is registered at 173. The next image data can be received, for example, from the video selection switch of FIG. 2. In conventional MPEG video encoders, after the difference between the current image and the next image has been determined by the encoder, then the next image data is registered at 172 as the current image data, and new image data from the input source (e.g., the video select switch of FIG. 2) is registered at 173 as the next image data. The encode section 171 outputs a series of frames including difference information between each successive set of current and next images.

In the video encoder of FIG. 17, a selector 175 is inserted between the next image register 173 and the current image register 172, thereby permitting the current image register to be selectively loaded from a cache memory such as described above with respect to FIGS. 7–0. When the switch control (see for example 113 in FIG. 11) indicates that the switch is being operated to effect a scene change, this scene change information is applied to the control input 73 of the cache 75. If the cache has stored therein image data corresponding to the scene that is being switched "to" then control output 70 controls the selector 175 such that the data output 72 from the cache is passed to the current image register 172, instead of loading the current image register from the next image register. Also at this time, the next image data is loaded from register 173 into the cache via cache input 76, for use later when switching back to the scene corresponding to that image. In this manner, when a scene switch occurs, for example from scene A to scene B, the encoder of FIG. 17 avoids comparing a current image from scene A to a next image from (likely dissimilar) scene B, by loading the current image register 172 with cached image data that corresponds to scene B when scene B was last switched away "from".

Figure 18:
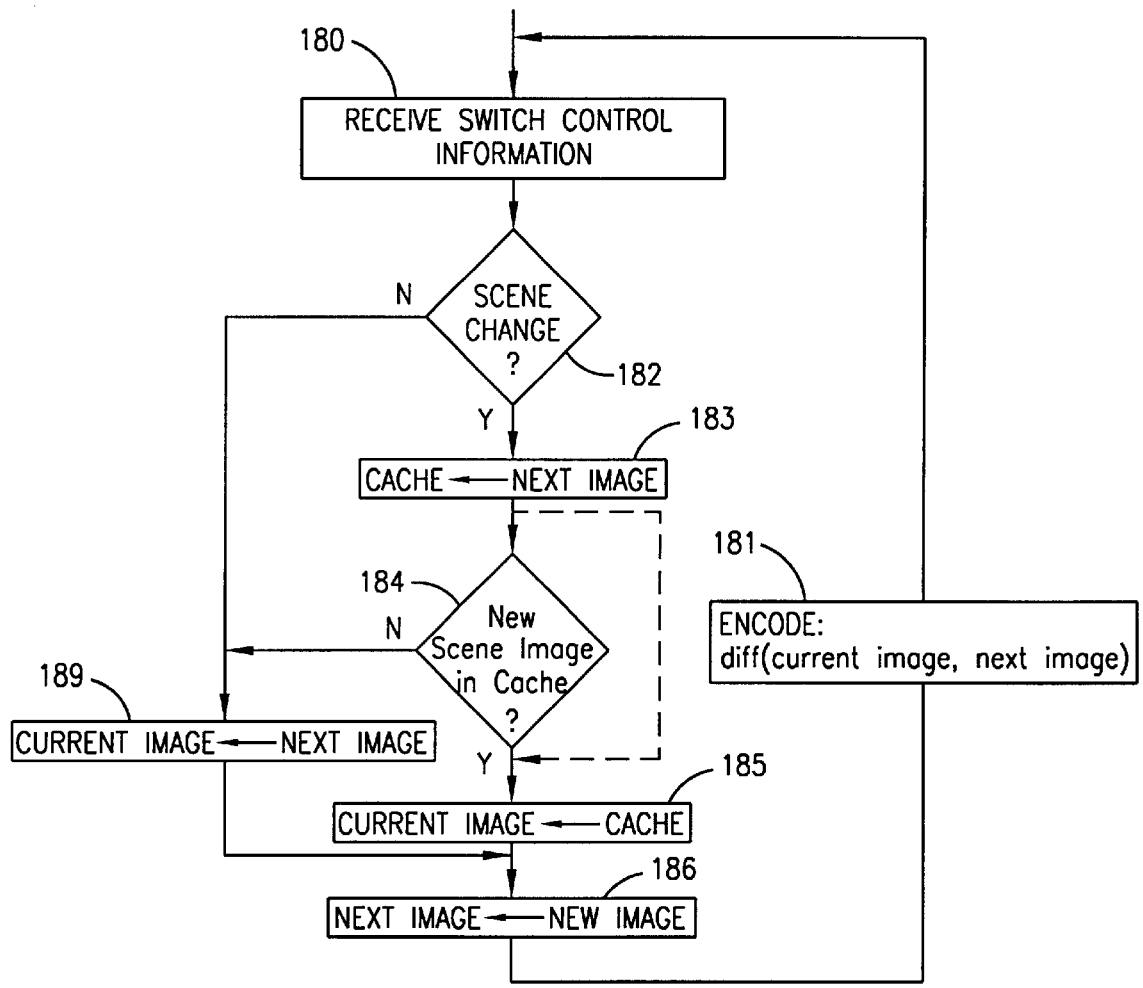
FIG. 18 illustrates exemplary operations which can be performed by the video encoder of FIG. 17.

FIG. 18 illustrates exemplary operations that can be performed by the exemplary encoder embodiment of FIG. 17. The current encode cycle is shown at 181, wherein the encode section performs the conventional encoding operation, producing output information that represents a difference between the current image and the next image. Switch control information is received at 180. If the switch control information indicates at 182 that a scene change is occurring, then the next image is stored in the cache memory at 183 and, if the cache memory has stored therein image data corresponding to the new scene at 184, then the current image is loaded from the cache memory at 185. Thereafter at 186, a new image from the input source (in this case the image from the new scene) is loaded as the next image, and encoding continues at 181. If there is no scene change at 182, or if there is no image data in the cache corresponding to the new scene at 184, then the next image becomes the current image at 189, and a new image from the input source is loaded as the next image at 186, after which encoding continues at 181.

The broken lines in FIGS. 17 and 18 correspond to the above-described broken line embodiments of FIGS. 7–10, wherein the detector 93 is omitted from cache 75.

Figure 19:
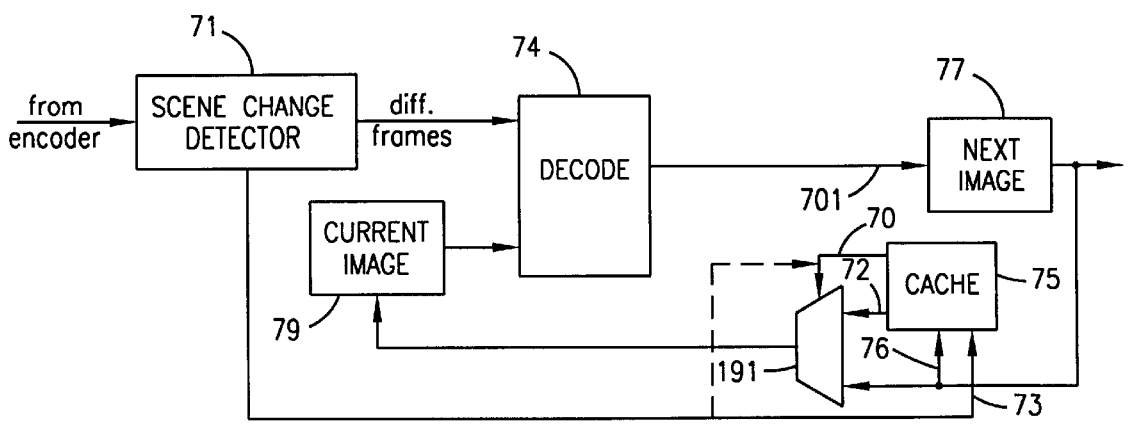
FIG. 19 illustrates pertinent portions of exemplary embodiments of a video decoder according to the invention for use in conjunction with the video encoder of FIG. 17.

FIG. 19 illustrates pertinent portions of exemplary embodiments of a predictive video decoder which is advantageously cooperable with the exemplary video encoder of FIG. 17. The decoder of FIG. 19 is similar to the decoder of FIG. 7, except a selector 191 is inserted between the next image register 77 and the current image register 79, in order to permit the current image register to be selectively loaded from the cache memory 75 instead of the next image register 77. The output 701 of the decode section 74 is coupled to the input of the next image register 77, as is conventional. When the scene change detector 71 indicates to the cache 75 via control input 73 that a scene change has occurred, the cache 75 selectively, and generally in the same manner described above with respect to FIGS. 7–10, controls selector 191 to couple the data output 72 of the cache 75 to the input of the current image register 79, and also stores the next image data available at input 76.

Upon a change from scene A to scene B, the decoder of FIG. 19 permits the decode section 74 to receive, via the current image register, scene B image data that was previously stored in the cache from the next image register 77 when scene B was last switched "from". Recall that the first difference frame produced by the encoder of FIG. 17 after a scene change from scene A to scene B represents a difference between the first new image of scene B and the image of scene B that was in the current image register 172 immediately before scene B was last switched away from. It is therefore evident that, in response to a detected scene change, the decode section 74 of FIG. 19 receives from the current image register 79 image data that properly corresponds to the difference information produced by the encoder of FIG. 17 in response to the scene change, thus synchronizing the operation of the FIG. 19 decoder to the operation of the FIG. 17 encoder.

Figure 20:
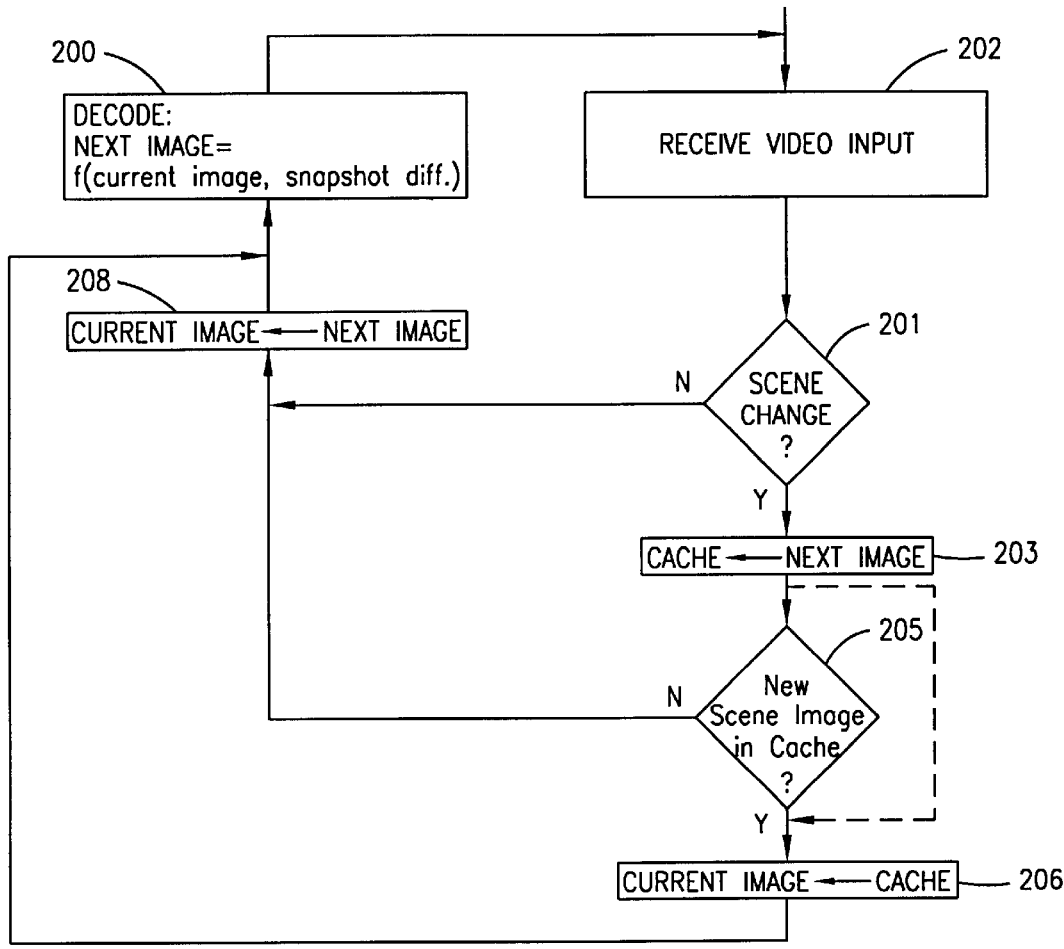
FIG. 20 illustrates exemplary operations which can be performed by the video decoder of FIG. 19.

FIG. 20 illustrates exemplary operations which can be performed by the exemplary video decoder of FIG. 19. At 200, the decode operation is illustrated, as in FIG. 8. Video input is received at 202. If a scene change is indicated at 201, then the next image data is stored in the cache at 203. If the cache at 205 contains image data corresponding to the new scene, then the current image register is loaded from the cache at 206, after which decoding is performed at 200. If there is no scene change at 201, or if the cache does not contain image data corresponding to the new scene at 205, then the current image register is loaded from the next image register at 208, after which decoding is performed at 200.

The broken lines in FIGS. 19–20 correspond to the above-described broken line embodiments of FIGS. 7–10 and 17–18, wherein the detector 93 is omitted from the cache 75.

It will be evident from the foregoing detailed description that the inventive embodiments described above with respect to FIGS. 1–20 can be implemented, for example, by suitably modifying software, hardware or both in conventional predictive audio and video encoders and decoders.

Although exemplary embodiments of the present invention have been described above in detail, this does not limit the scope of the invention, which can be practiced in a variety of embodiments.

What is claimed is:

1. A video decoding method, comprising;

providing input image data;

providing difference information indicative of a difference between images captured by a video transmitter apparatus;

deciding whether to output predicted image data produced as a function of the input image data and the difference information, or to output other image data produced independently of the difference information and the input image data, wherein said deciding step includes determining whether an input video stimulus seen by the video transmitter apparatus has been changed from a first video stimulus to a second video stimulus, deciding to output the predicted image data if the input video stimulus has not been changed, and deciding to output the other image data if the input video stimulus has been changed; and outputting one of the predicted image data and the other image data as decided in said deciding step.

2. The method of claim 1, wherein said step of outputting the other image data includes outputting previously predicted image data which corresponds to the second video stimulus and was previously predicted as a function of previous input image data and previous difference information at an earlier time when the second video stimulus was previously the input video stimulus.

3. The method of claim 2, including detecting that the input video stimulus has changed from the second video stimulus to another video stimulus, and storing said previously predicted image data in response to detection of the change from the second video stimulus to another video stimulus.

4. The method of claim 1, wherein said step of determining an input video stimulus change includes examining a frame header of a frame in which the difference information is provided.

5. The method of claim 1, wherein said step of determining an input video stimulus change includes monitoring Internet Protocol (IP) traffic in a plurality of IP applications operating in parallel.

6. The method of claim 1, wherein said step of determining an input video stimulus change includes monitoring sources of Internet Protocol (IP) traffic in an IP application.

7. The method of claim 1, including, if the input video stimulus has been changed, storing previously predicted image data which corresponds to the first video stimulus and was previously predicted as a function of previous input image data and previous difference information.

8. A video decoding method, comprising:

providing difference information indicative of a difference between images captured by a video transmitter apparatus;

providing output image data as a function of the difference information and input image data;

deciding whether to update the input image data in response to the output image data, or independently of the output image data, wherein said deciding step includes determining whether an input video stimulus seen by the video transmitter apparatus has been changed from a first video stimulus to a second video stimulus, deciding to update the input image data in response to the output image data if the input video stimulus has not been changed, and deciding to update the input image data independently of the output image data if the input video stimulus has been changed; and updating the input image data as decided in said deciding step.

9. The method of claim 8, wherein said step of updating the input image data independently includes providing previous output image data which corresponds to the second video stimulus and was previously provided as a function of previous difference information and previous input image data at an earlier time when the second video stimulus was previously the input video stimulus.

10. The method of claim 9, including detecting that the input video stimulus has changed from the second video stimulus to another video stimulus, and storing said previous output image data in response to detection of the change from the second video stimulus to another video stimulus.

11. The method of claim 8, wherein said step of determining an input video stimulus change includes examining a frame header of a frame in which the difference information is provided.

12. The method of claim 8, wherein said step of determining an input video stimulus change includes monitoring Internet Protocol (IP) traffic in a plurality of IP applications operating in parallel.

13. The method of claim 8, wherein said step of determining an input video stimulus change includes monitoring sources of Internet Protocol (IP) traffic in an IP application.

14. The method of claim 8, including storing the output image data if the input video stimulus has been changed.

15. An audio decoding method, comprising:

determining whether an input sound stimulus received by an audio transmitter apparatus has changed from a first sound stimulus to a second sound stimulus;

setting a current state of a digital filter to a predetermined state in response to detection of a change in the sound stimulus input received by the audio transmitter; and using the digital filter in said predetermined state to perform audio decoding.

16. The method of claim 15, wherein said step of determining an input sound stimulus change includes examining a frame header of a frame in which the audio data is provided.

17. The method of claim 15, wherein said step of determining an input sound stimulus change includes monitoring Internet Protocol (IP) traffic in a plurality of IP applications operating in parallel.

18. The method of claim 15, wherein said step of determining an input sound stimulus change includes monitoring sources of Internet Protocol (IP) traffic in an IP application.

19. A video encoding method, comprising:

receiving first image data corresponding to a first image in a sequence of images, thereafter receiving second image data corresponding to a second image in the sequence of images, and thereafter receiving third image data corresponding to a third image in the sequence of images;

in response to the first and second image data, providing first difference information indicative of a difference between the first and second images;

deciding whether to provide second difference information indicative of a difference between the second and third images, or instead to provide third difference information indicative of a difference between the third image and a further image other than the second image; and providing one of the second difference information and the third difference information as decided in said deciding step.

20. The method of claim 19, wherein said deciding step includes determining whether an input video stimulus has been changed from a first video stimulus to a second video stimulus, deciding to output the second difference information if the input video stimulus has not been changed, and deciding to output the third difference information if the input video stimulus has been changed.

21. The method of claim 20, wherein said step of providing third difference information includes providing further image data which corresponds to said further image and to the second video stimulus, and which was previously received at a time when the second video stimulus was previously the input video stimulus.

22. The method of claim 20, including detecting that the input video stimulus has changed from the second video stimulus to another video stimulus, and storing said further image data in response to detection of the change from the second video stimulus to another video stimulus.

23. The method of claim 20, including storing the second image data if the input video stimulus has been changed.

24. A video decoding apparatus, comprising:
an output for providing output image data,
a decode unit having an input for receiving input image data and difference information indicative of a difference between images captured by a video transmitter apparatus, said decode unit operable for producing predicted image data as a function of said input image data and said difference information;
a scene change detector for detecting whether an input video stimulus seen by the video transmitter apparatus has been changed from a first video stimulus to a second video stimulus, wherein the scene change detector also provides an indication of whether the input video stimulus has so changed, said selector responsive to said indication to select said predicted image data if the input video stimulus has not been changed, and to select said other image data if the input video stimulus has been changed; and
a selector coupled to said scene change detector and coupled between said decode unit and said output for selectively providing to said output one of said predicted image data and other image data produced independently of said input image data and said difference information.

25. The apparatus of claim 24, wherein said other image data includes previous predicted image data which corresponds to the second video stimulus and was previously provided by said decode unit as a function of previous input image data and previous difference information at an earlier time when the second video stimulus was previously the input video stimulus.

26. The apparatus of claim 24, wherein said scene change detector includes a frame buffer and a frame header analyzer coupled to said frame buffer for examining a frame header of a frame in which said difference information is provided.

27. The apparatus of claim 24, wherein said scene change detector includes a plurality of Internet Protocol (IP) applications operating in parallel, and a traffic analyzer coupled to said IP applications for monitoring IP traffic in said IP applications.

28. The apparatus of claim 24, wherein said scene change detector includes an Internet Protocol (IP) application and a source analyzer coupled to said IP application for monitoring sources of IP traffic in said IP application.

29. The apparatus of claim 24, including an image data storage apparatus coupled to said scene change detector and responsive to said indication that the input video stimulus has changed for storing in said storage apparatus previously predicted image data which corresponds to the first video stimulus and was previously produced by said decode unit as a function of previous input image data and previous difference information.

30. The apparatus of claim 24, including an image data storage apparatus for storing therein said other image data, said selector having a data input coupled to said storage apparatus to receive therefrom said other image data.

31. A video decoding apparatus, comprising:
an output for providing output image data;
a decode unit having an input for receiving input image data and for receiving difference information indicative of a difference between images captured by a video transmitter apparatus, said decode unit responsive to said input image data and said difference information for providing said output image data as a function of said difference information and said input image data;
a scene change detector for detecting whether an input video stimulus seen by the video transmitter apparatus has been changed from a first video stimulus to a second video stimulus, wherein the scene change detector also provides an indication of whether the input video stimulus has so changed, said selector responsive to said indication to select said output image data if the input video stimulus has not been changed, and to select said other image data if the input video stimulus has been changed; and
a selector coupled to said scene change detector and coupled between said output and said decode unit input for selecting one of said output image data and other image data produced independently of said output image data, and providing the selected image data to said decode input to update said input image data.

32. The apparatus of claim 31, wherein said other image data includes previous output image data which corresponds to the second video stimulus and was previously provided by said decode unit as a function of previous input image data and previous difference information at an earlier time when the second video stimulus was previously the input video stimulus.

33. The apparatus of claim 31, wherein said scene change detector includes a frame buffer and a frame header analyzer coupled to said frame buffer for examining a frame header of a frame in which said difference information is provided.

34. The apparatus of claim 31, wherein said scene change detector includes a plurality of Internet Protocol (IP) applications operating in parallel, and a traffic analyzer coupled to said IP applications for monitoring IP traffic in said IP applications.

35. The apparatus of claim 31, wherein said scene change detector includes an Internet Protocol (IP) application and a source analyzer coupled to said IP application for monitoring sources of IP traffic in said IP application.

36. The apparatus of claim 31, including an image data storage apparatus coupled to said scene change detector and responsive to said indication that the input video stimulus has changed for storing in said storage apparatus previous output image data which corresponds to the first video stimulus and was previously produced by said decode unit as a function of previous input image data and previous difference information.

37. The apparatus of claim 31, including an image data storage apparatus for storing therein said other image data, said selector having a data input coupled to said storage apparatus to receive therefrom said other image data.

38. An audio decoding apparatus, comprising:
- a change detector for determining whether an input sound stimulus received by an audio transmitter apparatus has changed from a first sound stimulus to a second sound stimulus, said change detector including an output for indicating whether the input sound stimulus has changed;
- a decode unit having an audio input for receiving audio data from the audio transmitter apparatus, a control input coupled to said change detector output, and a digital filter coupled to said audio input and said control input; and
- said decode unit responsive to an indication at said control input that the input sound stimulus has changed for setting a current state of said digital filter to a predetermined state, and said decode unit operable for using said digital filter in said predetermined state to perform audio decoding based on said audio data.

39. The apparatus of claim 38, wherein said change detector includes a frame buffer and a frame header analyzer coupled to said frame buffer for examining a frame header of a frame in which said audio data is provided.

40. The apparatus of claim 38, wherein said change detector includes a plurality of Internet Protocol (IP) applications operating in parallel, and a traffic analyzer coupled to said IP applications for monitoring IP traffic in said IP applications.

41. The apparatus of claim 38, wherein said change detector includes an Internet Protocol (IP) application and a source analyzer coupled to said IP application for monitoring sources of IP traffic in said IP application.

42. A video encoding apparatus, comprising:
- a first input for sequentially receiving first image data corresponding to a first image in a sequence of images, second image data corresponding to a second image in the sequence of images, and third image data corresponding to a third image in the sequence of images;
- a second input coupled to said first input for sequentially receiving therefrom said first, second and third image data;
- an encode unit coupled to said first and second inputs and operable in response to image data received at said first and second inputs for providing difference information indicative of a difference between images respectively corresponding to said image data received at said first and second inputs, said encode unit operable when said first and second image data are respectively present at said second and first data inputs for providing first difference information indicative of a difference between said first and second images; and
- a selector coupled between said first and second inputs and operable when said second image data is present at said first input for selecting one of said second image data and further image data other than said second image data, and for providing the selected image data to said second input.

43. The apparatus of claim 42, wherein said selector includes a control input for receiving an indication of whether an input video stimulus from which said sequence of images is produced has been changed from a first video stimulus to a second video stimulus, said selector responsive to said indication for selecting said second image data if the input video stimulus has not been changed, and for selecting said further image data if the input video stimulus has been changed.

44. The apparatus of claim 43, wherein said further image data includes previous image data which corresponds to the second video stimulus and which was previously received at said first input at a time when the second video stimulus was previously the input video stimulus.

45. The apparatus of claim 43, including an image data storage apparatus having a data input coupled to said first input, said storage apparatus including a control input for receiving an indication that the input video stimulus has changed from the first video stimulus to the second video stimulus, said storage apparatus operable when said second image data is present at said first input for storing said second image data in said storage apparatus in response to said indication that the input video stimulus has changed.

46. The apparatus of claim 42, including an image data storage apparatus for storing therein said further image data, said selector having a data input coupled to said storage apparatus to receive therefrom said further image data.

* * * * *